Sept. 30, 1930.   R. G. DUGAS   1,776,893
TURBINE
Filed Oct. 27, 1928   2 Sheets-Sheet 1

Inventor
Rodolph G. Dugas
By
Hardway Cathey
Attorneys

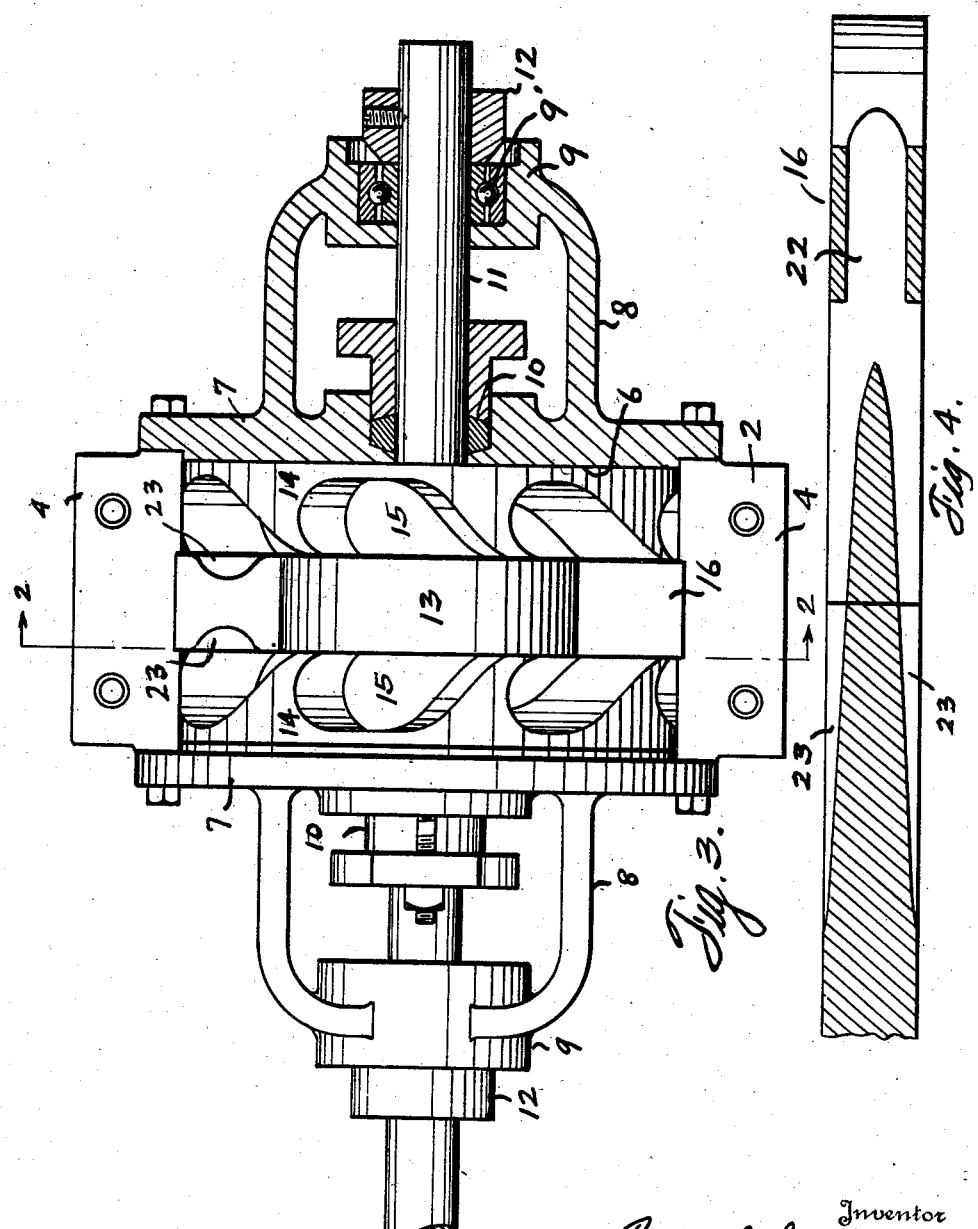

Patented Sept. 30, 1930

1,776,893

UNITED STATES PATENT OFFICE

RODOLPH G. DUGAS, OF BEAUMONT, TEXAS

TURBINE

Application filed October 27, 1928. Serial No. 315,363.

This invention relates to new and useful improvements in a turbine.

One object of the invention is to provide a turbine of the character described embodying a casing having an annular stator therein and rotors fixed relative to each other one on each side of the stator, each side of the stator having an annular channel and the adjacent sides of the rotors being provided with a series of pockets adapted to successively register with the corresponding stator channels and provided to receive the motive fluid, said turbine being provided with a motive fluid inlet which branches so as to simultaneously deliver the motive fluid into the pockets on each side of the stator as well as with outlet openings leading from the series of pockets on each side of the stator.

With the above and other objects in view this invention has particular relation to certain novel features of construction, operation and arrangement of parts an example of which is given in this specification and illustrated in the accompanying drawings, wherein:—

Figure 3 shows a plan view of the turbine, partly in section, showing the top of the casing and the adjacent section of the stator removed, and Figure 4 shows a sectional view of the stator taken on the line 4—4 of Figure 2.

Figure 2:
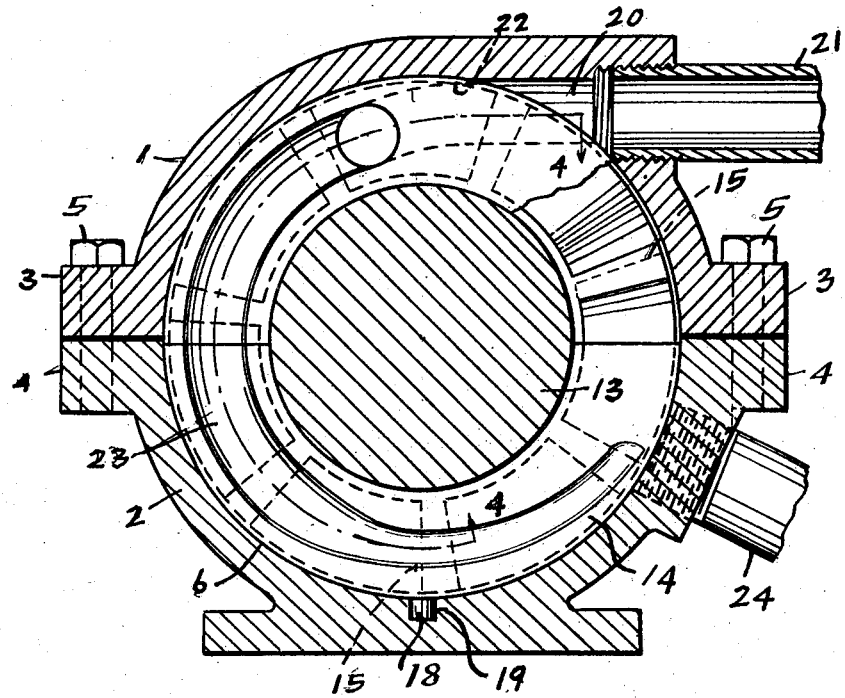
Figure 2 shows a cross sectional view taken on the line 2—2 of Figure 3.
Figure 1:
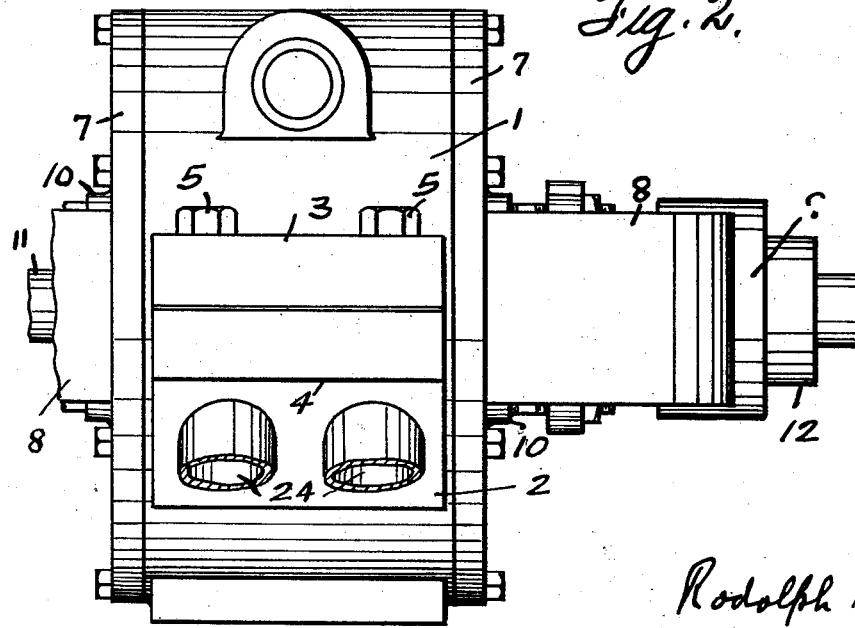
Figure 1 shows an elevation of the turbine.

Referring now more particularly to the drawings, wherein like numerals of reference designate similar parts in each of the figures, the numerals 1, 2 designate the upper and lower sections of the turbine casing which have the coinciding outwardly turned flanges 3, 4 secured together by the bolts 5. The casing has the inside chamber 6, circular in form, and enclosed by the circular end plates 7, 7 which are bolted to the respective ends of the casing. Each end plate has a bracket 8 said brackets being provided with the bearing housings 9, 9 in which are the antifriction bearings as 9', aligned with each other and with the stuffing boxes 10, 10 carried by and concentric with the end plate 7.

Rotatably mounted in said bearings and stuffing boxes there is a shaft 11, which is retained against endwise movement by means of the retainer collars 12, 12 which are secured on said shaft and abut the outer ends of said bearings 9'.

Formed integrally with the shaft 11, and fitted closely within the chamber 6 there is a cylinder 13 whose ends fit against the end plates 7 and which has the spaced rotors 14, 14 formed thereon whose outer ends are flush with the cylinder ends and which fit closely within the chamber 6. The inner, or facing sides of these rotors have the spaced pockets 15, 15. Fitted closely around the cylinder 13, between the rotors 14 there is an annular stator 16 preferably formed of two sections, and whose outer side is counter sunk into the walls of the casing. This stator has an external stud 18 which is seated into a corresponding recess 19 in the casing to hold the stator against turning.

The casing has a substantially tangential motive fluid inlet 20 into which the inlet line 21 is connected and the stator has a peripheral inlet channel 22 which separates into the arcuate side channels 23, 23 which gradually taper out and extend around the stator and with which the pockets 15 register successively as the rotors turn. At the ends of these side channels the casing is provided with the discharge outlets 24, 24 with which the outlet ends of said channels communicate.

Steam or other fluid, under pressure, is admitted through the inlet line 21 and passes through the inlet 22 and side channels 23, into the pockets 25 in registration with said side channels and forces the rotors to turn, the steam trapped in said pockets 15 being exhausted from said pockets successively through the outlets 24.

The rotors 14 are balanced and their pockets will simultaneously receive equal impulses of the motive fluid and a very powerful and smooth running turbine is thus provided.

While I have shown what I now consider to be the preferred form of the invention it is obvious that mechanical changes may be made therein and equivalents substituted for the parts shown within the principle of the invention.

What I claim is:—

1. A turbine including a casing having an inlet, a pair of rotors fitted in the casing and spaced apart, a stator between said rotors, each side of the stator having an arcuate channel in communication with said inlet, and the sides of the rotors adjacent the stator having pockets which register successively with the corresponding channels as the rotors rotate, said casing having outlets with which said channels communicate and with which said rotor pockets successively register.

2. A turbine having a casing with an internal chamber, a pair of rotors spaced apart and rotatable as a unit, a stator fitted closely between the rotors, each side of the stator having an arcuate channel, said casing having a pressure fluid inlet leading into said channels and also having outlets with which said channels communicate, the sides of the rotors adjacent the stator having spaced pockets, each pocket being arranged to register with its corresponding channel and outlet alternately as the rotors rotate.

3. A turbine including a casing having an inlet for motive fluid and discharge outlets, a cylinder in the casing chamber having spaced rotors, an annular stator around said cylinder and fitted closely between the rotors, said stator having arcuate channels which communicate with said inlet and terminate at said outlets, the sides of the rotors adjacent the stator having spaced pockets, each pocket being positioned to register with its corresponding channel and outlet as the stators rotate.

4. A turbine including a casing having an inlet for motive fluid and discharge outlets, a cylinder in the casing chamber having spaced rotors, an annular stator around said cylinder between the rotors, said stator having arcuate channels which communicate with said inlet and outlets, the sides of the rotors adjacent the stator having spaced pockets, each pocket being positioned to register with its corresponding channel and outlet as the stators rotate and a shaft for taking off power from said rotors.

5. A turbine including a casing having an inlet, a cylinder fitted closely within the casing and having an annular channel therearound forming two rotors, an annular stator fitted closely into said channel, said stator having an arcuate channel on each side which said inlet enters and the sides of the rotors adjacent said stator having pockets, there being outlets for said channels through which the motive fluid may escape from said pockets, as the rotors turn, said stator being formed of sections and means for holding the stator against rotation in the casing.

In testimony whereof I have signed my name to this specification.

RODOLPH G. DUGAS.